United States Patent Office 3,505,707
Patented Apr. 14, 1970

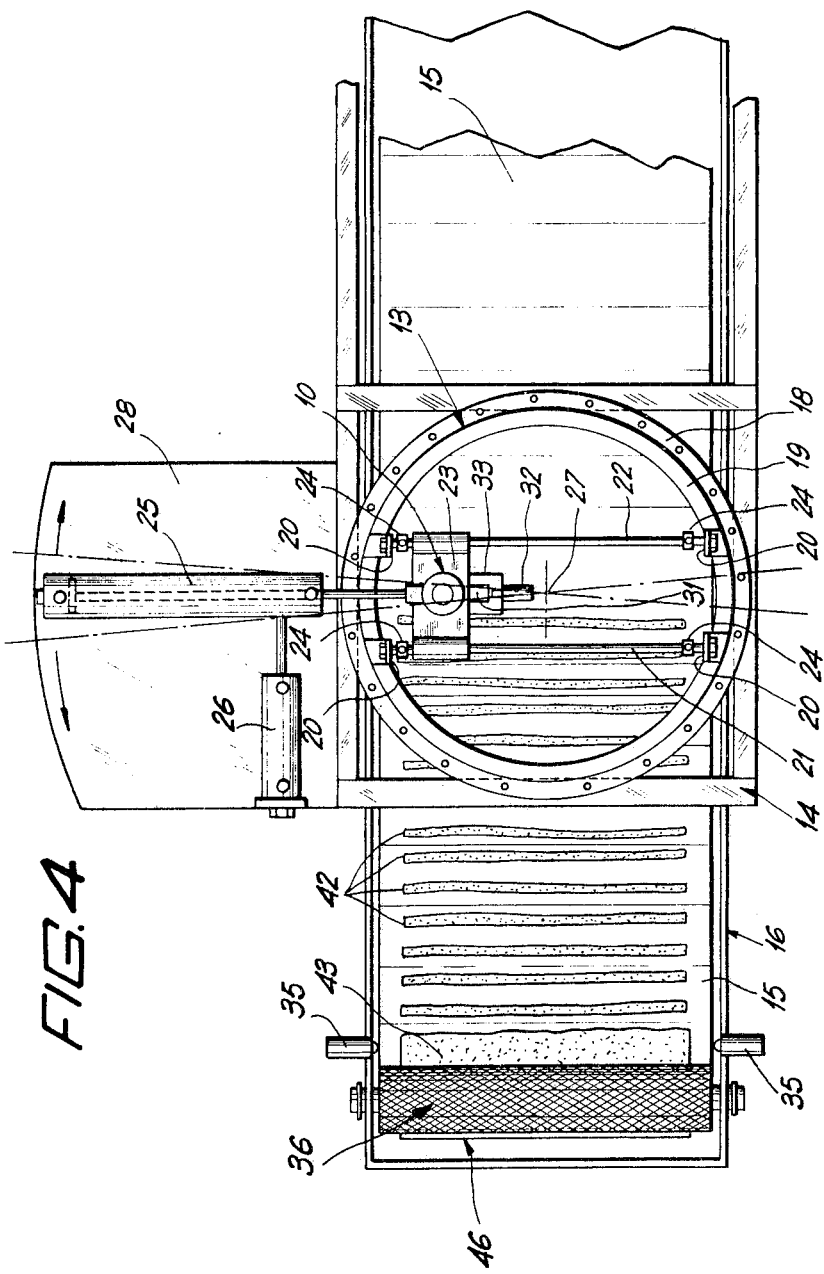

3,505,707
APPARATUS FOR THE MANUFACTURE OF ARTIFICIAL CHAMOIS LEATHERS WITHOUT TEXTILE SUPPORTS, ESPECIALLY OF REGENERATED CELLULOSE
Pierre E. Villain, Beauvais, France, assignor to Novacel, Paris, France, a French corporation
Filed Mar. 28, 1967, Ser. No. 626,578
Claims priority, application France, Apr. 12, 1966, 57,253
Int. Cl. B29d 7/10
U.S. Cl. 18—15                                                                  10 Claims

ABSTRACT OF THE DISCLOSURE

Apparatus for providing a layer of material for the production of an artificial chamois which comprises in combination, a conveyor means adapted to receiving threads of paste, extrusion nozzle coupled with a source of paste and mounted above said conveyor means with to-and-fro movement on a support means capable of annular displacement about an axis perpendicular to said conveyor means, cutting means located at the level of said extrusion nozzle, the means of controlling the output of paste from said extrusion nozzle associated therewith, control means provided to insure the respective movement of said extrusion nozzle and support means so as to control the supply of paste from said extrusion nozzle in the form of threads deposited on said conveyor means perpendicular to its direction of forward movement and, downstream from extrusion nozzle a means associated with said conveyor means to form said threads of paste into a layer of same.

---

The present invention relates to apparatus for the continuous manufacture of artificial chamois leathers without textile supports, especially of cellular regenerated cellulose, and having a transverse strength substantially equal to its longitudinal strength.

A known method of manufacture of these articles consists of forming on a moving conveyor belt, a layer of viscose paste containing porosity-creating materials and reinforcement fibres, this layer being obtained by spreading into a thin layer a mass of paste brought on to the conveyor belt by transverse friction, in such manner that the fibres become orientated in the direction of rubbing, these fibres being then disorientated by the action of a roller on the layer of paste, this roller rotating at a peripheral speed higher than the speed of movement of the belt, the layer thus formed being finally subjected to the usual treatments of regeneration and finishing.

Another known process of manufacture of the said kind of articles consists of forming a layer of paste by extrusion with the use of an extrusion die or nozzle, giving a longitudinal orientation to the reinforcement fibres, and then of disorientating the fibres by transverse rubbing applied to the previously-formed layer, without reducing its thickness, the said layer being then subjected to the usual treatments of regeneration and finishing.

Methods of these kinds do not give complete satisfaction for rational manufacture of the articles considered.

The present invention has for its object to provide a remedy for these disadvantages, and to this end proposes a device for carrying out the manufacture of artificial chamois leathers under substantially improved conditions as compared with the conditions of the prior art.

Utilizing the device of the present invention, the method of manufacture of artificial chamois leathers without textile supports, especially of regenerated cellulose and having a transverse strength substantially equal to the longitudinal strength, is especially characterized in that there is deposited on a moving member, for example a conveyor belt, parallel threads or ribbons of paste having a length equal to the desired width of the chamois leather, in that the threads are formed by extrusion of a paste which is constituted in particular by viscose, porosity-creating material and reinforcement fibres, and in that the extrusion gives the fibres contained in the paste an orientation in the longitudinal direction of the threads, after which the parallel threads are subjected to a spreading action causing on the one hand a welding together of the threads and on the other hand the disorientation of the fibres, the layer thus formed being then conveyed by the moving element to the usual baths of regeneration and finishing.

The present invention is directed to a device for carrying into effect the above method, this device being especially characterized in that it comprises, an extrusion nozzle in the form of a hopper coupled to a supply source of paste and disposed immediately above a conveyor element such as a belt, this nozzle being on the one hand mounted movably in a to-and-fro movement above the belt on a support which is itself capable of angular movements about an axis perpendicular to the belt and being advantageously provided on the other hand with cutting means adapted to cut off the threads of paste at the level of the extrusion orifices, while means are provided for controlling the respective movements of the said nozzle and of its support, for controlling the flow-rate of the paste and when so required to correct this flow-rate, and also to transform the threads deposited on the belt downstream of the said nozzle into a layer of pre-determined thickness carried away by the said conveyor belt to the above specified treatments.

According to a characteristic feature of the device according to the invention, the extrusion nozzle support is constituted by two coaxial rings, one fixed on a chassis astride the belt and receiving the other capable of rotation, which is equipped to carry parallel guides having a diametral direction on which the nozzle can move.

With an arrangement of this kind, for a given forward speed of the conveyor belt, it is possible, by appropriate orientation and speed of displacement of the nozzle, to deposit perpendicularly to the direction of advance of the belt, threads of paste which are parallel to each other and in which the fibres are orientated in the longitudinal direction of the threads.

According to another characteristic feature, there is provided downstream of the extrusion nozzle, a feed control device constituted by a photo-electric cell adapted to correct automatically any possible variations in the delivery rate of the nozzle. Beyond the control device, in the direction of movement of the conveyor belt, the threads of paste thus deposited are flattened so as to form a layer. The flattening of the threads is preferably effected at the terminal portion of the conveyor belt by means of a grooved roller mounted above the winding drum of the belt. The grooved roller, adjustable in height with respect to the drum, in addition to having the advantage of forming layers of thicknesses which are variable at will, possesses that of disorientating the reinforcement fibres previously orientated in the transverse direction of the belt.

It will be understood that this device offers a large number of possibilities for the production of artificial chamois leathers of regenerated cellulose without textile supports, having a transverse strength substantially equal to the longitudinal strength.

Other characteristic features and advantages of the invention will furthermore be brought out in the description which follows below, given solely by way of example with reference to the accompanying drawings, in which:

FIG. 4 is a view from above of the plate and the extrusion nozzle.

Figure 1:
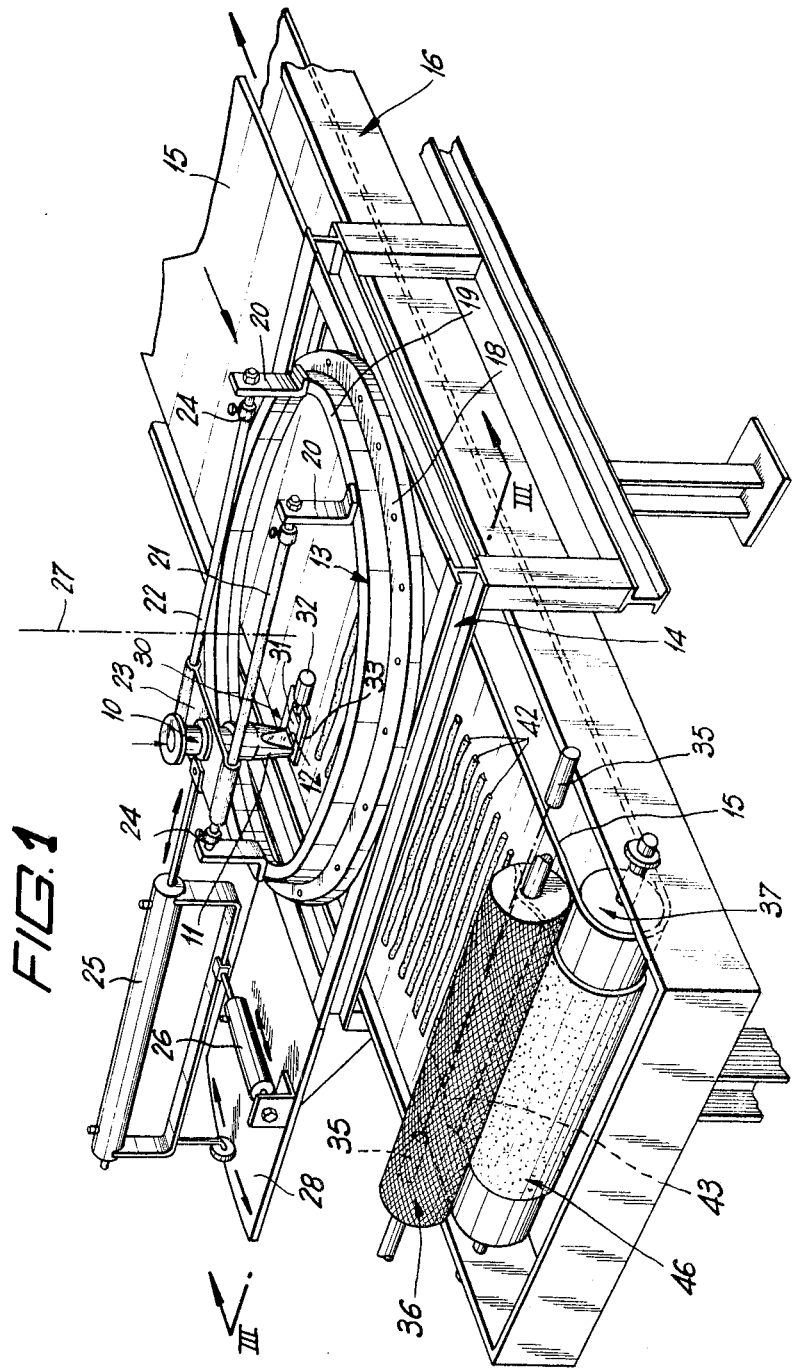
FIG. 1 is a diagrammatic view in perspective of one form of construction of the device according to the invention.
Figure 3:
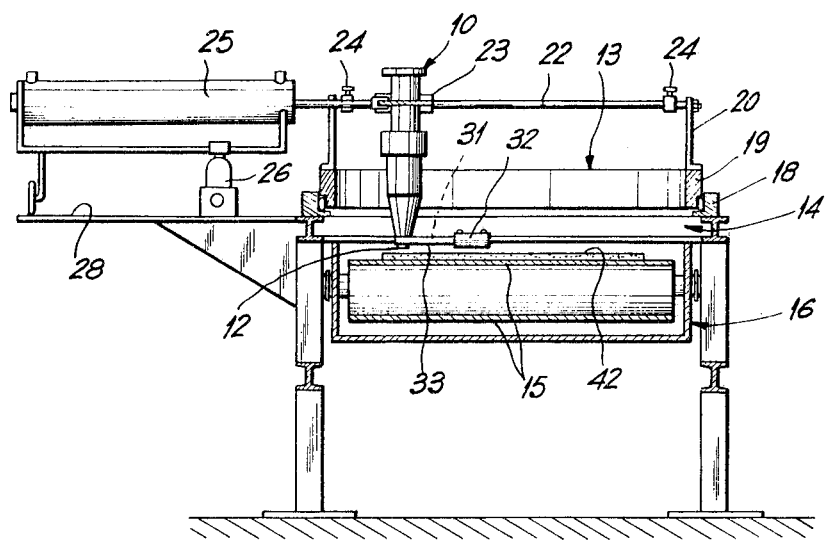
FIG. 3 is a cross-section taken along the line III—III of FIG. 1.

In the form of construction chosen and illustrated in FIGS. 1, 3 and 4, the device according to the invention comprises an extrusion nozzle indicated generally at 10, which is coupled in any suitable manner to a source of paste (not shown). This nozzle is composed of a hopper 11 of generally trapezoidal shape which is provided at its lower portion with one or a number of outlet orifices 12 having a section which can be adjusted at will, thus offering the possibility of extruding threads of different sections.

The nozzle 10 is movably mounted on a support or plate indicated at 13, which is in turn carried by a chassis 14 astride the upper side of a conveyor belt 15, the lower side of which circulates in a tank 16 which provides the usual treatments.

The nozzle support 13 is constituted by a first ring 18 fixed on the chassis 14, and by a second ring 19 rotatably mounted in any appropriate manner in the first ring. Through the intermediary of brackets 20, this second ring carries guides 21 and 22 arranged on each side of a diameter, on which the nozzle 10 can move by means of a sliding sheath 23 with which it is associated.

Movable abutments 24 on the guides 21 and 22 are intended to limit the movements of the nozzle 10 according to requirements.

With the sheath 23, there is rigidly associated a jack 25 intended to effect the to-and-fro movements of the nozzle on the guides, while a second jack 26, coupled for example to the previous jack, is intended to ensure the angular displacements of the second ring about a vertical axis of rotation indicated at 27. This second jack 26 is fixed in any appropriate manner, for example on a shelf 28 which at the same time forms a flat supporting surface for the first jack 25.

The extrusion die is advantageously provided at its extrusion orifices with cutting means indicated at 30, comprising essentially a small plate 31 movable by means of a jack 32 in a slide 33 fixed on the die.

On the downstream side of the assembly described above, there are provided means for controlling the supply of paste, constituted for example by a photo-electric cell 35 forming part of a relay. This cell is arranged at the level of the top side of the conveyor belt and in the immediate vicinity of a roller 36, the function of which will become apparent later, and which is mounted vertically above a drum 37 on which moves the conveyor belt. The roller 36 is preferably grooved and is adjustably mounted on supports (not shown), so as to form with the outer surface of the belt, a space which defines the thickness of the layer.

Figure 2:
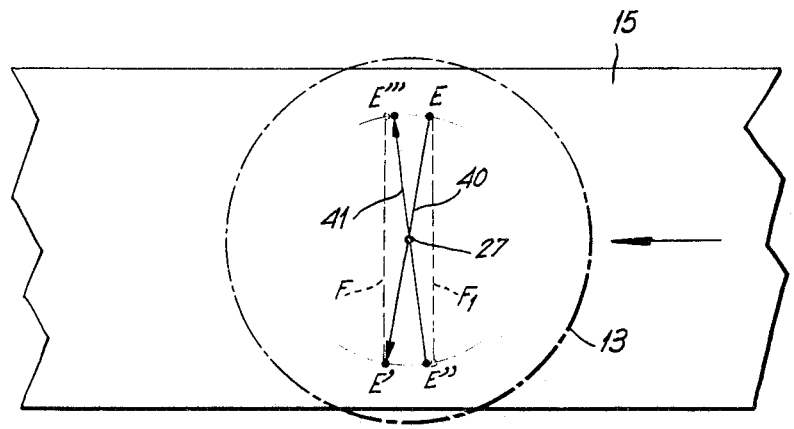
FIG. 2 shows in plan view the course followed by the extrusion nozzle during the course of one to-and-fro movement.

The operation of the device described above is as follows. Reference will be made more particularly to FIG. 2, from which it is seen that at the beginning of the cycle, the nozzle 10 occupies a position indicated at E. As a function of the speed of movement of the belt and of the speed of advance of the nozzle on its guides, the jack 26 directs the nozzle for example along a line of movement shown at 40. Thus, from the point E to the point E' corresponding to the outgoing movement, the nozzle deposits one or more threads F on the conveyor belt, and by reason of judicious adjustments, these threads are deposited perpendicularly to the axis of forward movement of the belt. At the point E', the cutting means come into action and cut-off the threads at the outlet of the extrusion orifices. For the purpose of the return movement, the jack 26 is again actuated in the direction opposite to the preceding and by the same amount, which causes rotation of the nozzle-carrying ring 19 about the axis 27.

From the point E" to which it is brought, the extrusion nozzle follows a path indicated at 41 and terminating at E'''; as previously, the nozzle deposits on the belt one or more threads $F_1$, spaced apart from those preceding and parallel to these latter.

The jack 26 is then again put into action so as to bring back the nozzle to its initial starting point E, and a fresh cycle begins again.

There are thus obtained on the conveyor belt threads of paste 42 (FIG. 1) uniformly spaced apart and arranged perpendicularly on each side of the axis of the conveyor belt.

The threads of paste 42 thus deposited on the belt have their reinforcement fibres orientated along the axes of the threads and are carried in front of the control device 35, then between the roller 36 and the drum 37, the roller 36 rotating at a linear speed equal to the speed of movement of the belt.

It will be noted that at this level the quantity of paste deposited on the belt is provided so as to form, on the upstream side of the roller 36, a roll of paste 43 which is intended to facilitate the welding together of the threads while at the same time it renders uniform the spread-out layer. This roll, which is clearly visible in FIG. 4, is located at the level of the control device, and when it exceeds a pre-determined maximum thickness, the control device acts through the intermediary of a relay on the output of paste in such manner as to reduce the volume of the threads. This relay can be arranged to act on the output of the pump and/or on the repetition frequency of the cycle of deposit of the threads.

Conversely, when the roll of paste becomes smaller than a pre-determined minimum value, the action of the cell results in an increase in volume of the deposited threads.

On the downstream side of the roller 36 and the drum 37, the layer thus formed, shown at 46, has its fibres disorientated by its passage between the rollers and adheres to the conveyor belt, which leads it through the usual regeneration and finishing treatment baths.

It will be understood that the invention is not limited to the form of embodiment chosen and illustrated, and it may on the contrary form the subject of modifications without thereby departing from the scope of the invention. Thus for example, the control device, instead of being constituted by a photo-electric cell, may comprise a feeler such as a roller in contact with the roll, or by any other feeler means arranged so as to effect the above specified functions under good conditions.

In addition, the extrusion orifices of the die are preferably made adjustable in order to permit the volume of the threads deposited on the conveyor belt to be reduced or increased for the purpose of regularizing the above roll.

Furthermore, the conveyor belt may be provided with designs on its surface which are transferred to the surface of the layer of paste.

What I claim is:

1. Apparatus for providing a layer of material for the production of an artificial chamois which comprising in combination, a conveyor means adapting to receiving threads of paste, extrusion nozzle coupled with a source of paste and mounted above said conveyor means with to-and-fro movement on a support means capable of annular displacement about an axis perpendicular to said conveyor means, cutting means located at the level of said extrusion nozzle, the means of controlling the output of paste from said extrusion nozzle associated therewith, control means provided to insure the respective movement of said extrusion nozzle and support means so as to control the supply of paste from said extrusion nozzle in the form of threads deposited on said conveyor means perpendicular to its direction of forward movement and, downstream from extrusion nozzle a means associated with said conveyor means to form said threads of paste into a layer of same.

2. The apparatus of claim 1 wherein said support means for said extrusion nozzle comprises two coaxial means, one being fixed on a chassis astride said conveyor means and receiving the other comprising a ring which is movable about a vertical axis of rotation, and on which guide means are disposed for controlling the movements of said nozzle along the diameter of said ring.

3. The apparatus of claim 2, wherein said to-and-fro movement of said extrusion nozzle is actuated by a jack associated therewith, while a second jack coupled to said first jack effects the angular movements of said ring carrying said nozzle, adjustable stops being provided on said guide means so as to determine the length of the travel of said nozzle.

4. The apparatus of claim 1, wherein said cutting means associated with said nozzle comprises a plate movable under the action of a jack, said plate permitting the periodic cutting-off of the threads of paste at the outlet of said nozzzle.

5. The apparatus of claim 1, wherein said means for controlling the output of paste comprises a photo-electric cell located at the height of said conveyor means and downstream of said extrusion nozzle near said means for forming the threads of paste into a layer.

6. The apparatus of claim 1 wherein the means for controlling the output of paste comprises a feeler means.

7. The apparatus of claim 1, wherein said means for controlling the output of paste is adapted to act on the delivery of a supply pump associated with said source of paste.

8. The apparatus of claim 1, wherein said means for controlling the output of paste is adapted to act on the repetition frequency of the deposition cycle of the threads.

9. The apparatus of claim 1, wherein said means for transforming the threads to a layer comprise a grooved roller mounted downstream of said control means, said grooved roller being mounted at the end of said conveyor means vertically above a winding drum associated with said conveyor means, said grooved roller being adjustable vertically so as to form a space defining the thickness of said layer.

10. The apparatus of claim 1, wherein said extrusion nozzle comprises a plurality of extrusion orifices with variable delivery openings.

References Cited

UNITED STATES PATENTS

| | | |
|---|---|---|
| 2,287,356 | 6/1942 | Newman. |
| 2,419,951 | 5/1947 | Kastel. |
| 3,052,565 | 9/1962 | Chenn et al. _____ 18—15 XR |
| 3,099,042 | 7/1963 | Rabl _____ 18—15 XR |
| 3,111,715 | 11/1963 | Hofer _____ 18—15 |

WILLIAM J. STEPHENSON, Primary Examiner

U.S. Cl. X.R.

18—4